(12) United States Patent
Stephens et al.

(10) Patent No.: US 11,457,277 B2
(45) Date of Patent: Sep. 27, 2022

(54) CONTEXT-BASED ACTION SUGGESTIONS

(71) Applicant: SONY INTERACTIVE ENTERTAINMENT INC., Tokyo (JP)

(72) Inventors: Mischa Stephens, San Mateo, CA (US); Steven Trombetta, San Mateo, CA (US); Daniel Hiatt, San Mateo, CA (US); Benedikt Neuenfeldt, Tokyo (JP); Junya Noda, Tokyo (JP); Atsushi Fuse, Tokyo (JP); Nobukazu Koyama, Tokyo (JP); Adil Sherwani, San Mateo, CA (US); Derek Parker, San Mateo, CA (US); Parsa Shirazi, San Mateo, CA (US); Charles Wayne Denison, II, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 17 days.

(21) Appl. No.: 16/554,364

(22) Filed: Aug. 28, 2019

(65) Prior Publication Data

US 2021/0067833 A1   Mar. 4, 2021

(51) Int. Cl.
*G06F 3/00* (2006.01)
*G06F 13/00* (2006.01)
(Continued)

(52) U.S. Cl.
CPC ... *H04N 21/4532* (2013.01); *H04N 21/44222* (2013.01); *H04N 21/47* (2013.01);
(Continued)

(58) Field of Classification Search
CPC ........... H04N 21/4532; H04N 21/4668; H04N 21/8545; H04L 65/403; H04L 65/1069
See application file for complete search history.

(56) References Cited

U.S. PATENT DOCUMENTS

| | | |
|---|---|---|
| 10,576,379 B1 | 3/2020 | Wakeford et al. |
| 2005/0192097 A1 | 9/2005 | Farnham et al. |

(Continued)

FOREIGN PATENT DOCUMENTS

| | | |
|---|---|---|
| CN | 114503534 | 5/2022 |
| WO | WO 2021/041288 | 3/2021 |
| WO | WO 2021/041289 | 3/2021 |

OTHER PUBLICATIONS

Lucero, Andres, Jussi Holopainen, and Tero Jokela. "MobiComics: collaborative use of mobile phones and large displays for public expression." In Proceedings of the 14th international conference on Human-computer interaction with mobile devices and services, pp. 383-392. 2012 (Year: 2012).

(Continued)

*Primary Examiner* — Gigi L Dubasky
(74) *Attorney, Agent, or Firm* — Polsinelli LLP

(57) ABSTRACT

A system and method for making context-based action suggestions is provided. Data regarding one or more activities may be stored in memory. Such activities may be associated with an interactive content title and one or more actions. Information regarding a current user status for each activity may be received by a server. A set of one or more activities available to a user based on the current user status may be identified. One or more actions may be filtered based on availability to the user and the current user status for each identified activity. A subset of the filtered actions may be displayed.

28 Claims, 8 Drawing Sheets

(51) Int. Cl.
  *H04N 5/445* (2011.01)
  *H04N 21/45* (2011.01)
  *H04N 21/482* (2011.01)
  *H04N 21/84* (2011.01)
  *H04N 21/475* (2011.01)
  *H04N 21/442* (2011.01)
  *H04N 21/47* (2011.01)

(52) U.S. Cl.
  CPC ....... *H04N 21/4755* (2013.01); *H04N 21/482* (2013.01); *H04N 21/84* (2013.01)

(56) References Cited

U.S. PATENT DOCUMENTS

| | | |
|---|---|---|
| 2008/0207315 A1 | 8/2008 | Bloebaum et al. |
| 2010/0035691 A1 | 2/2010 | Wild et al. |
| 2012/0222069 A1* | 8/2012 | Chavez .................. H04N 7/147 725/106 |
| 2013/0045804 A1 | 2/2013 | Ruke |
| 2013/0310181 A1 | 11/2013 | Kislyi et al. |
| 2014/0187314 A1* | 7/2014 | Perry ...................... A63F 13/79 463/29 |
| 2016/0028846 A1* | 1/2016 | Coglitore ................ H04L 67/26 709/204 |
| 2017/0001111 A1* | 1/2017 | Willette .................. A63F 13/49 |
| 2017/0106290 A1 | 4/2017 | Pierce et al. |
| 2017/0239564 A1 | 8/2017 | Prakash |
| 2017/0291109 A1* | 10/2017 | Jensen .................. A63F 13/795 |
| 2019/0201786 A1* | 7/2019 | Muller .................... A63F 13/35 |
| 2020/0154155 A1* | 5/2020 | Sanghavi .............. H04L 65/608 |
| 2021/0067566 A1 | 3/2021 | Stephens |
| 2021/0409459 A1 | 12/2021 | Stephens |

OTHER PUBLICATIONS

U.S. Appl. No. 16/554,375 Office Action dated Jun. 12, 2020.
PCT Application No. PCT/US2020/047585 International Search Report and Written Opinion dated Sep. 30, 2020.
U.S. Appl. No. 16/554,375 Final Office Action dated Oct. 16, 2020.
PCT Application No. PCT/US2020/047584 International Search Report and Written Opinion dated Nov. 20, 2020.
PCT Application No. PCT/US2020/047584 International Preliminary Report on Patentability dated Mar. 1, 2022.
PCT Application No. PCT/US2020/047585 International Preliminary Report on Patentability dated Mar. 1, 2022.
U.S. Appl. No. 17/468,529 Office Action dated May 25, 2022.

* cited by examiner

CONTEXT-BASED ACTION SUGGESTIONS

BACKGROUND OF THE INVENTION

1. Field of the Invention

The present technology pertains to providing suggestions to a user. More specifically, the present technology may include providing context-based action suggestions to users.

2. Description of the Related Art

Platform-based gameplay (e.g., Sony PlayStation®) may include a variety of content (e.g., a game, an interactive movie, etc.) to play, interact with other users, or otherwise interact with the selected content in different ways. Digital games may include different modes of interaction, such as multiplayer, single-player, open world, competitive, etc. Each game title (and each gameplay mode thereof) may include different available activities each associated with different types of available actions.

Presently available ways for making recommendations regarding specified actions of an activity to a user may be limited to providing a singular or high level recommendation to the user simply based the next linearly available activity within a gaming environment. Such conventional recommendations may not be able to identify activities based on other factors that may be of interest to the user or relevant activities located elsewhere within the gaming environment, thereby depriving the user of the opportunity to discover new and engaging activities. Further, such conventional recommendations may also not be able to identify activities and/or actions of games not owned by the user, thereby depriving the user of the opportunity to discover new and engaging activities for purchase.

Due to an ever-increasing amount of interactive content titles and activities, action and activity recommendations can be crucial to maintaining or increasing user engagement with a platform. Off-base recommendations may deter a user from selecting any activity. Further, poor recommendations may deter a user from interacting with the platform or cease interaction with the platform.

There is, therefore, a need in the art for systems and methods for providing context-based action suggestions.

SUMMARY OF THE PRESENTLY CLAIMED INVENTION

Embodiments of the present invention include systems and methods for providing context-based action suggestions. Data regarding one or more activities may be stored in memory. Such activities may be associated with an interactive content title and one or more actions. Information regarding a current user status for each activity may be received by a server. A set of one or more activities available to a user based on the current user status may be identified. One or more actions may be filtered based on availability to the user and the current user status for each identified activity. A subset of the filtered actions may be displayed.

Various embodiments may include methods for making context-based action suggestions. Such methods may include storing data regarding one or more activities in memory. Each activity may be associated an interactive content title and one or more actions. Such methods may include receiving information regarding a current user status for each activity. Such methods may include filtering the one or more actions based on availability to the user and the current user status for each identified activity. Such methods may include displaying a subset of the filtered actions.

Additional embodiments may include systems for making context-based action suggestions. Such systems may include memory for storing data regarding one or more activities. Each activity may be associated an interactive content title and one or more actions. Such systems may include a processor that executes instructions stored in memory. Execution of the instructions by the processor may receive information regarding a current user status for each activity. Execution of the instructions by the processor may identify a set of one or more activities available to a user based on the current user status. Execution of the instructions by the processor may filter the one or more actions based on availability to the user and the current user status for each identified activity. Execution of the instructions by the processor may display a subset of the filtered actions.

Further embodiments include non-transitory computer-readable storage media having embodied thereon a program executable by a processor to perform a method for making context-based action suggestions as described above.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for making context-based action suggestions. Data regarding one or more activities may be stored in memory. Such activities may be associated with an interactive content title and one or more actions. Information regarding a current user status for each activity may be received by a server. A set of one or more activities available to a user based on the current user status may be identified. One or more actions may be filtered based on availability to the user and the current user status for each identified activity. A subset of the filtered actions may be displayed.

Figure 1:
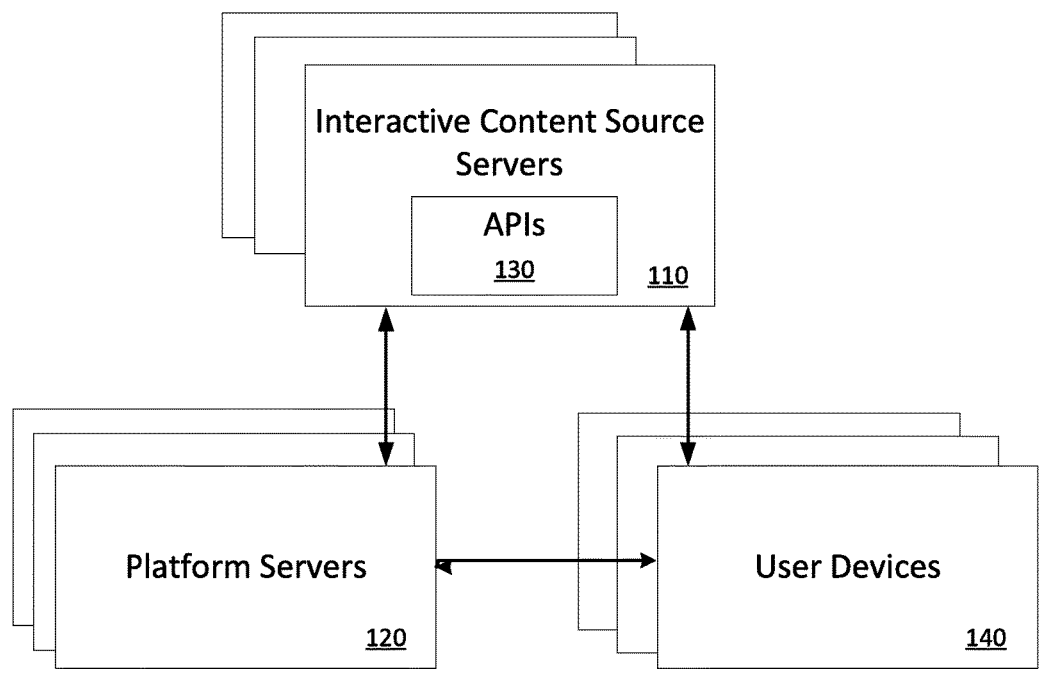
FIG. 1 illustrates a network environment in which a system for making context-based action suggestions may be implemented.

FIG. 1 illustrate a network environment 100 in which a system for making context-based activity suggestions may be implemented. The network environment 100 may include one or more interactive content source servers 110 that provide interactive content (e.g., video games, interactive video, etc.), platform servers 120, and user devices 140.

Interactive content source servers 110 may maintain and host interactive content titles (e.g., video games, interactive books, interactive movies, etc.) available for play to a user device 140 over a communication network. Such interactive content servers 110 may be implemented in the cloud (e.g., one or more cloud servers). Each interactive content title may include one or more activities available within the content title. The one or more activities may be playable by a single user or by multiple users. In one example, the interactive content title is a video game title having different modes of competitive gameplay available within that game title. In another example, the interactive content title is another video game title having an interactive storyline for single user play. Each activity may be associated with one or more actions that a user can select.

The platform server 120 may be responsible for communicating with the different interactive content source servers 110 in order to provide one or more context-based action suggestions to the user. Such server 120 may be implemented on the cloud servers 160. The interactive content source servers 110 may communicate with multiple platform servers 120. The platform server 120 may carry out instructions, for example, for storing data regarding one or more activities in memory. Each activity may be associated with an interactive content title and one or more actions. The platform server 120 may also carry out instructions, for example, for receiving information regarding a current user status for each activity. The platform server 120 may also carry out instructions, for example, for identifying a set of one or more activities available to the user based on the current user status. The platform server 120 may also carry out instructions, for example, for filtering the one or more actions based on availability to the user and the current user status for each identified activity. The platform server 120 may also carry out instructions, for example, for displaying a subset of the filtered activities.

The interactive content titles and their corresponding one or more activities and associated one or more actions may be provided through an application programming interface (API) 130, which allows various types of interactive content sources server 110 to communicate with different platform servers 120 and different user devices 140. API 130 may be specific to the particular computer programming language, operating system, protocols, etc., of the interactive content source servers 110 providing the interactive content titles, the platform servers 120 providing the associated templates, and user devices 140 receiving the same. In a network environment 100 that includes multiple different types of interactive content source servers 110 (or platform servers 120 or user devices 140), there may likewise be a corresponding number of APIs 130.

The user device 140 may include a plurality of different types of computing devices. For example, the user device 140 may include any number of different gaming consoles, mobile devices, laptops, and desktops. Such user devices 140 may also be configured to access data from other storage media, such as, but not limited to memory cards or disk drives as may be appropriate in the case of downloaded services. Such devices 140 may include standard hardware computing components such as, but not limited to network and media interfaces, non-transitory computer-readable storage (memory), and processors for executing instructions that may be stored in memory. These user devices 140 may also run using a variety of different operating systems (e.g., iOS, Android), applications or computing languages (e.g., C++, JavaScript). An exemplary user device 140 is described in detail herein with respect to FIG. 6.

Figure 2:
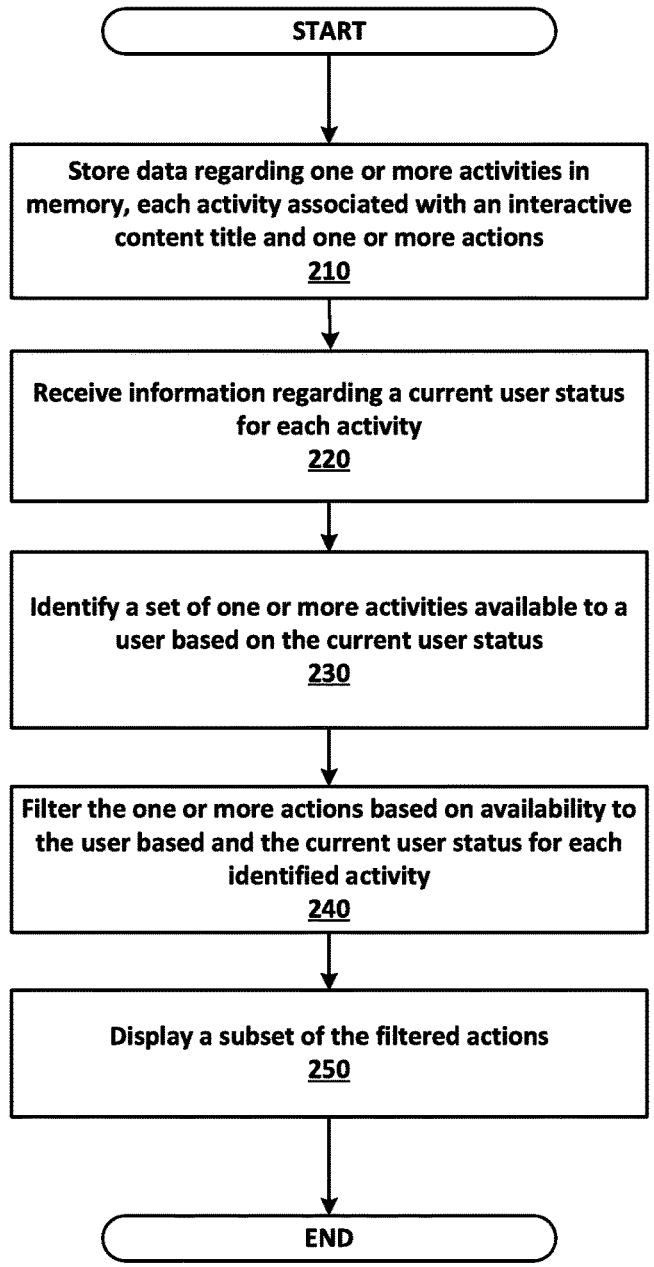
FIG. 2 is a flowchart illustrating an exemplary method for making context-based action suggestions.

FIG. 2A is a flowchart illustrating an exemplary method 200 for making context-based action suggestions. The method 200 of FIG. 2A may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 2A are performed in the cloud). The steps identified in FIG. 2A (and the order thereof) are exemplary and may include various alternatives, equivalents, or derivations thereof including but not limited to the order of execution of the same.

In step 210, data regarding one or more activities are stored in memory by the platform servers 120 and/or interactive content source servers 110. Each activity may be a progress type, where the user or a group of users completes a single or multiple discrete actions (e.g., one or more quests within a game); an open-ended type, where the player or group of players has no given task to complete (e.g., an open world game where users build objects or explore a gaming world); or a competitive type, where at least two players cooperatively or competitively participate in an activity, and a result is captured (e.g., a head to head match or a team versus boss match). Stored data for each activity may include one or more of an activity identifier (activity id), a category, a sub category, a name, a description, a time limited availability of the activity, associated rewards, a minimum or maximum number of players, associated tasks, associated statistics, and help options. For competitive type activities or activities for multi-player interactions, the stored data may include information such as a number of players that can participate in the interactive content, a number of players per party/team, prizes available, and/or time limits. Such stored data may further directly link the user to begin the activity or begin a matchmaking process which matches the user to a competitive match. Such link may, for example, allow the user to skip navigational steps conventionally required to begin interacting with an activity or to enter a competitive activity, such that the user simply selects the desired activity and immediately begin interacting with the activity or is immediately entered into matchmaking.

Each activity may further be associated with an interactive content title (e.g., a game, streaming video, etc.) and one or more actions. The one or more actions, some of which are displayed in FIGS. 3A-3F, may be a buy action, a spectate action, a start action, a resume action, a get help action, a play activity action, a play again action, a share action, a join action, a become player action, a demo action, or a download action.

Figure 3A:
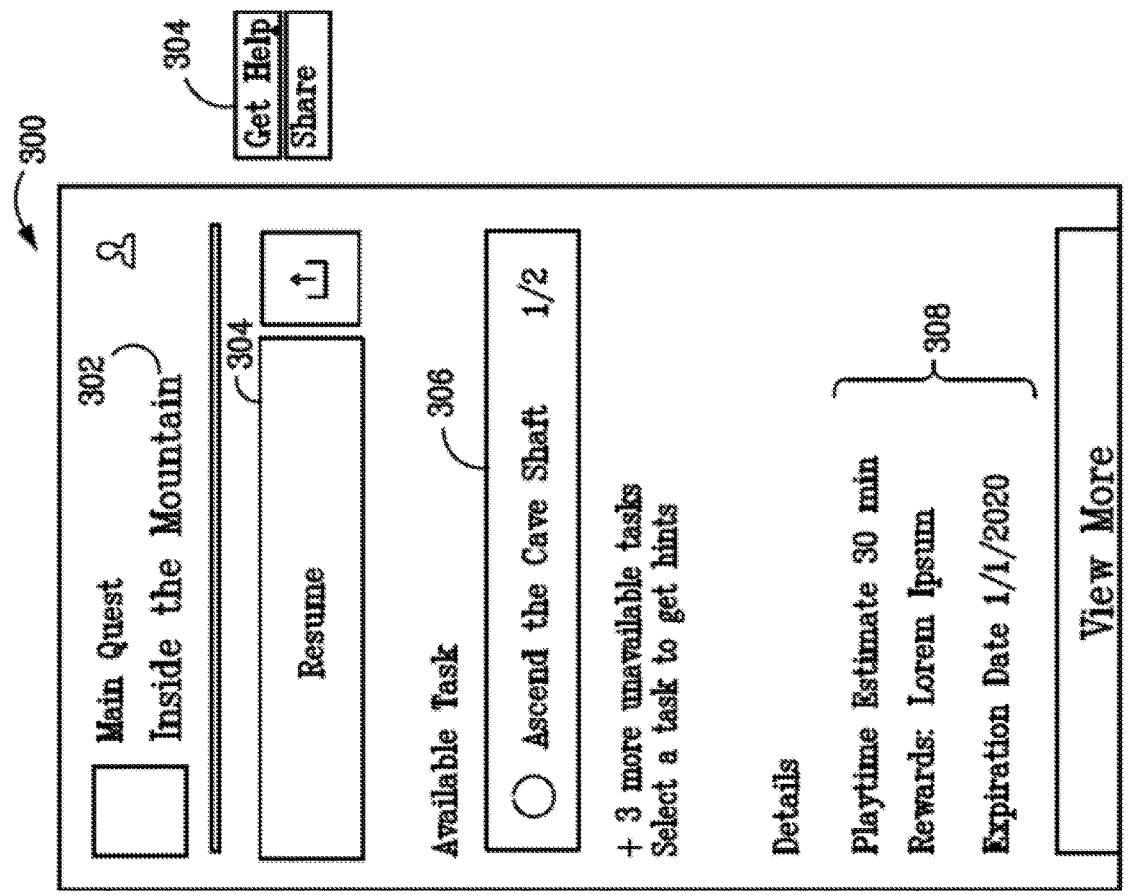
FIGS. 3A-3F illustrates exemplary user interfaces for detail displays of context-based action suggestions and an associated activity.
Figure 3B:
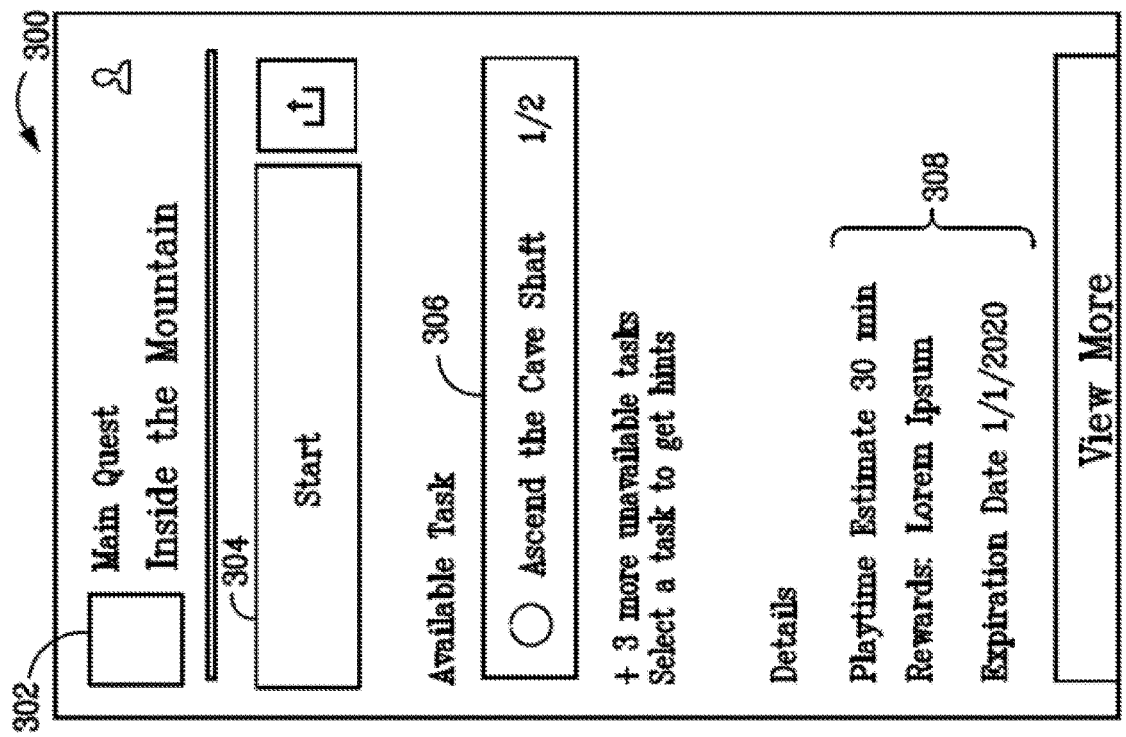
Figure 3D:
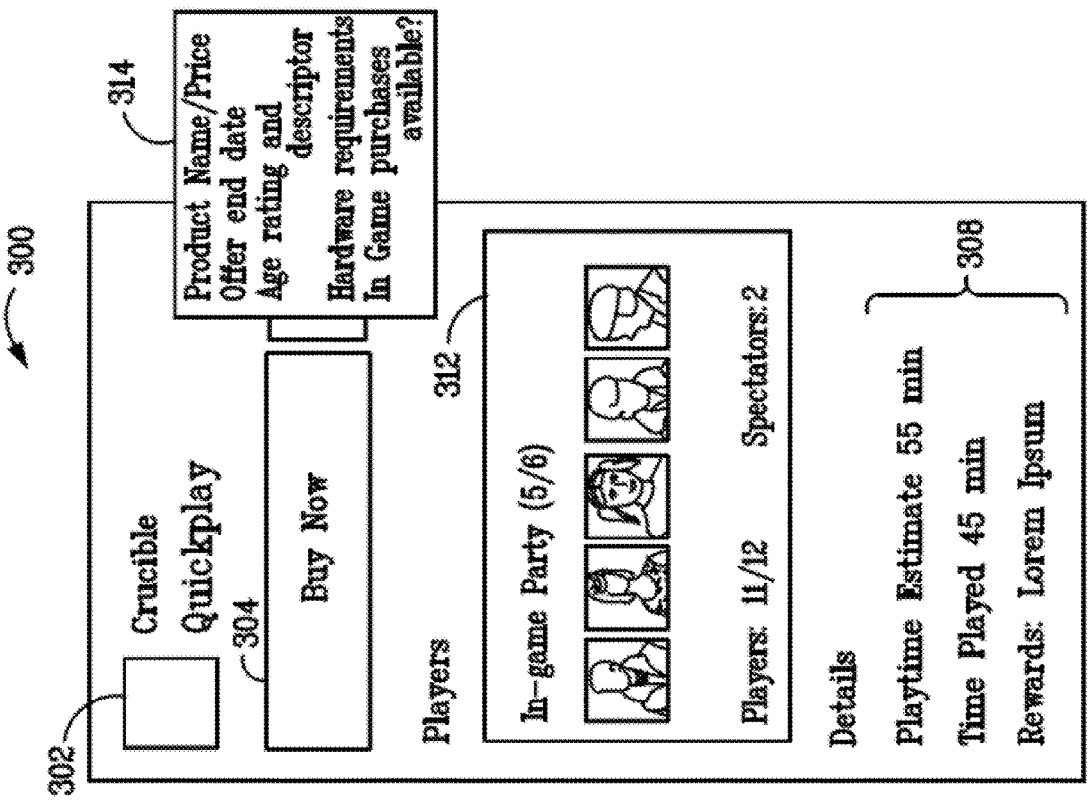
Figure 3C:
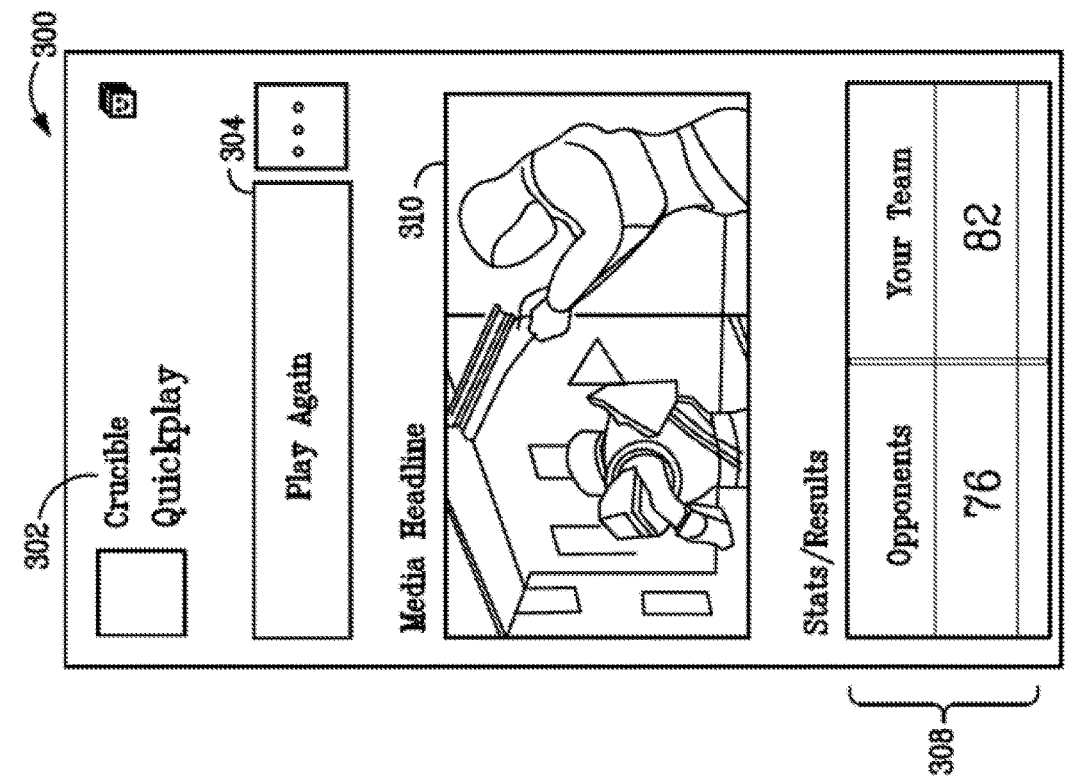
Figures 3E, 3F:
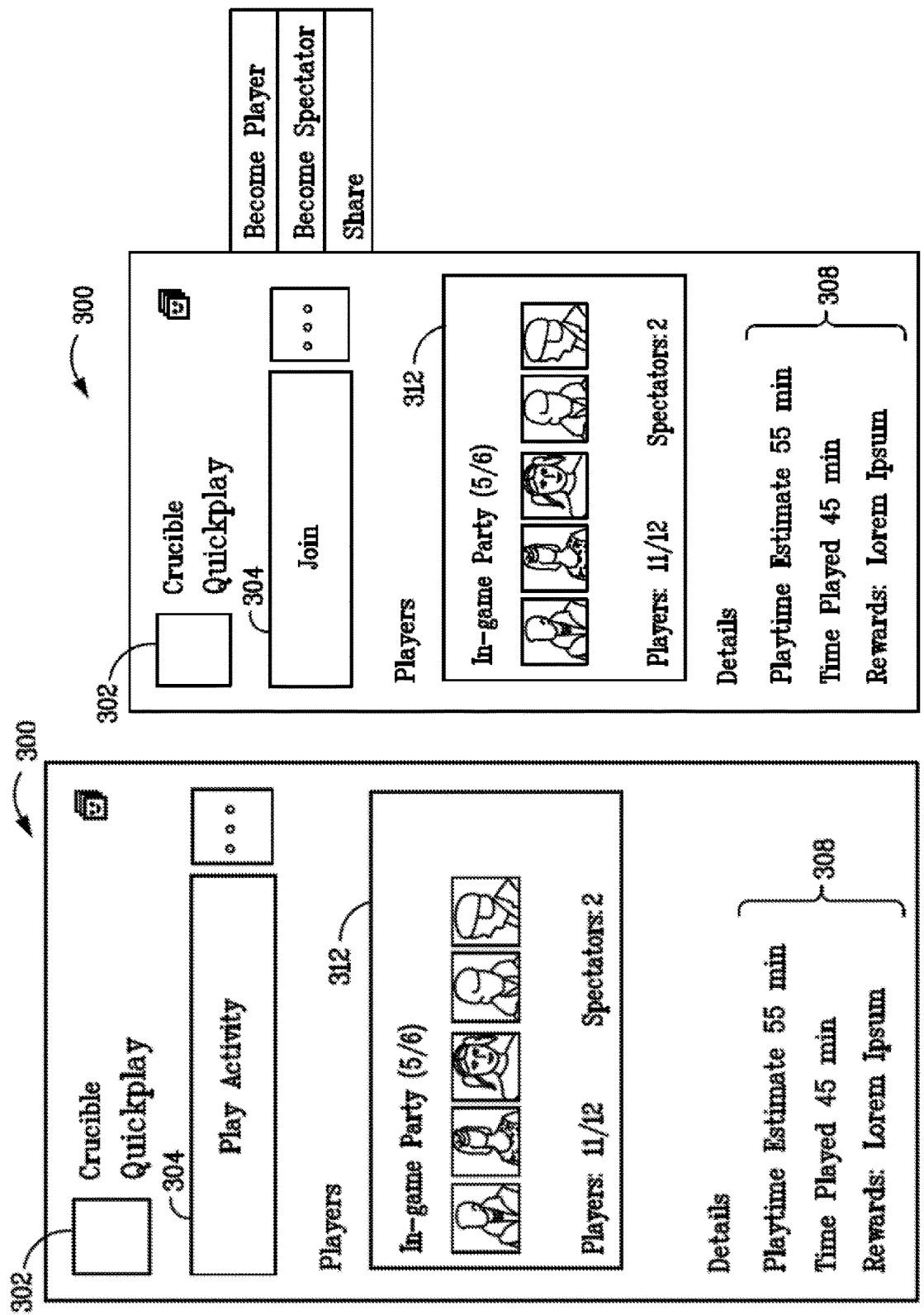

In FIGS. 3A-3F an exemplary user interface 300 for displaying activity information and a priority action are illustrated. Generally, each user interface 300 includes an activity title 302, the priority action 302, tasks 306, and/or activity information 308. The tasks 306 displayed may include completed and/or available tasks to the user. Statistics (scores, results of a match or competition, user or peer statistics, or play time) may also be displayed, as shown in FIG. 3C. Additional actions may be shown in an overflow window (e.g., a pop up window), as shown in FIGS. 3B and 3E, or shown within the initial interface.

In FIG. 3A, a start action 304 is shown. The start action 304 may be shown for any activity that is currently available to the user. Such availability may be determined based on a current user status within an activity, as will be discussed in more detail below with respect to step 230. In one example, receiving a selection of the start action 304 launches the associated activity. Such launching may include retrieving associated activity launch data based on an activity id of the stored activity data associated with the selected start action 304.

In FIG. 3B, a resume action and a get help action are shown. In one example, the resume action 304 and/or the get help action 304 may be shown to the user when the associated activity is in progress and the user has paused or otherwise exited the activity. Selection of the resume action 304 may directly launch the activity associated with the resume action 304 into a game environment at a last point of play. Such launching may include retrieving a last location of a game character from the corresponding current user status and launching the activity at the last location. Selection of the get help action 304 may retrieve publisher or user generated content (e.g., videos, screenshots, walk-throughs, articles, blogs) that provides a hint, tip, or walkthrough to aid the user through the associated activity. Such retrieval of content may include retrieving the content from the stored activity data or a third party provider (i.e., a peer or publisher).

In FIG. 3C, a play again and a share action are shown. The play again action 304 may be shown for an activity that is currently available to the player and that has been completed by the player. The display 300 may further include user generated content 310 (e.g., videos, screenshots, and/or commentary) captured by the user during interaction with the activity. Selection of the play again action 304 for a single player activity may launch the associated activity from the beginning and may reset an associated game character to a beginning level and/or skillset. Selection of the play again action 304 for a multiplayer activity may create a multiplayer session based on the past multiplayer session of the associated multiplayer activity and may send invites to each peer of the past multiplayer session. After each invited peer joins the multiplayer session or is replaced by another peer, the multiplayer activity may be launched from the beginning. For example, a multiplayer session may repeat a dungeon that the session agrees to replay. Moving to the share action 304, the share action 304 may be shown if the activity has been completed by the user and may be shown for single player or multiplayer activities. Selection of the share action may share the associated activity to a peer. Such sharing may include transmitting an activity id, content, and/or activity information to the peer(s).

FIG. 3D illustrates a buy now action and can include, though not shown, a demo action and a download action. The buy now action 304 and/or a demo action, may be displayed when the user does not own the activity and/or the associated interactive content title for either single player or multiplayer activities. Buy information 314 (e.g., activity name, activity price, buy end date, age rating, activity description, hardware requirement, and in-game buys availability) may be displayed, which may incentivize the user to buy the activity and/or the associated interactive content title. Selection of the buy now action 304 may generate a display or launch a new display for buy of the activity and/or the interactive content title by the user. After buy of the activity and/or the interactive content title, the buy now action 304 may change to a download action if the user does not already have the activity and/or the interactive content title downloaded. To incentivize buy of the activity and/or the interactive content title, the demo action may be displayed as the priority action or in the overflow display. The demo action may include time limited or goal limited gameplay of an activity. The demo action may be displayed for single player or multiplayer activities. For example, an multiplayer activity may be demoed by the user such that the user may participate in the multiplayer activity with the user's peers. In another example, a single player activity may be demoed by the user prior to buy of the single play activity and/or the interactive content title. Such demo action may incentive a user to buy the associated activity and/or the interactive content title.

In FIGS. 3E-3F, actions for multiplayer activities such as, for example, a play activity action, a join action, a spectate action, and a become player action, are shown.

Multi-player activities may include multi-player information 312 such as peer information, number of players currently playing, maximum number of players available, a number of spectators, number of players in a party, and/or maximum number of players allowed for the party. In FIG. 3E, the play activity action 304 is shown for a multiplayer game, which may add the user to an existing multiplayer session or generate a new multiplayer session. Adding the user to an existing multiplayer session may include identifying an open slot, verifying that the user meets a set of session requirements, and adding the user to the existing multiplayer session. Generating a new multiplayer session may include generating open slots for players and/or spectators and session requirements based on activity requirements, and adding to the user to one of the slots.

In FIG. 3F, the join action, the become player action, and the spectate action are shown. The join action 304, in some examples, is displayed when an active multiplayer session has an open slot and the user has an invitation to the multiplayer session and/or otherwise has access to the multiplayer session. Selection of the join action 304 may add the user to the active multiplayer session. The spectate action 304, in some examples, may be shown when a spectator slot is available prior to or during a multiplayer activity. Selection of the spectate action 304 may launch the activity and add the user to an open spectate slot. In some examples, the become player action 304 may be displayed either when the user is currently a spectator or the activity is in progress and an open player slot is available. Selection of the become player action 304 may move the user from a spectator slot to the open player slot or may launch the associated activity and add the user to the open player slot. The join action, spectate action, and become player action may change as peers enter or leave a multiplayer session and/or activity and spectate or player slots become available.

Additional actions may include a pinning action and an unpinning action, which may occur on a console or a mobile device. Selection of such pinning action may queue an associated activity on the user device 140 by launching the associated activity by a backend server, for example, such that the activity is available for immediate interaction by the user. For example, an activity may be pinned by a user to queue the activity for later interaction. A status of the pinned activity may be shared and displayed by the user to alert peers of the user's queuing of the activity. When the pinned activity is selected by the user, which will open the already-launched activity for immediate interaction with by the user.

Such pinned activity may include a primary action (i.e., spectate, join, play, play again, etc.) available to the user. Such primary action may change based on a status of the activity changing (e.g., a multiplayer activity has ended, a change in ownership of the activity, etc.), a device displaying the activity (e.g., mobile device or console), an updated user activity status, or the like. Selection of the unpinning action remove the associated activity from the queue by ending, or shutting down, the launched activity by the backend server.

Turning back to FIG. 2, in step 220, information regarding a current user status for each activity is received by the platform servers 120 and/or interactive content source servers 110. Such current user status may include a location of an associated game character within an environment of the interactive content title (e.g., a gaming environment), an estimated time to complete a current activity, whether a user has interacted with the interactive content title and/or activity, ownership information (e.g., whether the user owns the game), progress of the user, and/or a user history of the current activity. For example, a user may have completed a portion of one interactive content title, but has not yet interacted with a different interactive content title.

In step 230, a set of one or more activities available to a user based on the current user status is identified by the platform servers 120 and/or interactive content source servers 110. Such available activities may be based on one or more of a category, a sub category, a time limited availability, associated rewards, a minimum or maximum number of players, and associated tasks. For example, single player games may be identified as available to an offline user. Identified activities may include activities not yet owned by the user, and, as described above with respect to FIG. 3D, the user may be given an option to purchase the activity and/or the associated interactive content title.

The identified available activities may be further prioritized based on the current user status and user information. Prioritization can be based one or more factors of a mode of play, an availability of peers, peer status within the identified one or more of the interactive content titles (e.g., is the peer currently playing or has completed an activity associated with one of the interactive content titles), a predicted available playtime of the user (e.g., how much available time does the user have to play an activity), a user preferred content, currently viewed content of the user, a preferred user activity type, frequency of user interaction with each identified activity, frequency of peer interaction with each identified activity, recent user interaction with each identified activity, recent peer interaction with each identified activity, whether an activity is available from a publisher, and/or a respective level of how new each activity is. Such currently viewed content may include the interactive content titles, a social page, a rewards page, a page of recently played activities, a peer profile, and/or a page of peer activities. For example, if the user is viewing a rewards page, an action to play an activity related to earning a trophy may be prioritized higher than other actions. In another example, if the user is viewing a peer profile, an action to join the peer associated with the peer profile may be prioritized higher than other actions.

Prioritization can be based on a distance between a respective location of each activity within an interactive content title and the location of the game character. For example, one or more side quests may be located near a location of a game character. Such one or more side quests may be prioritized higher than other actions and shown to the user during gameplay. Such user may be incentivized to select one of the side quests as it is related to the user's current status within the game.

Prioritization may also be based on each identified activity having a playtime estimate that meets a playtime threshold. Such playtime threshold may be based on the predicted available playtime of the user. Such predicted available playtime of the user may be based on a schedule of the user, a calendar of the user, and/or historical user activity at one or more times of day. For example, the user may interact with the platform server 120 for thirty minutes every weekday night. In the same example, the predicted available playtime of the user may be thirty minutes during weekday nights, such that when the user begins interacting with the platform server 120 during a weekday night, activities that have a playtime estimate of thirty minutes or less may be prioritized and shown to the user.

Figure 5:
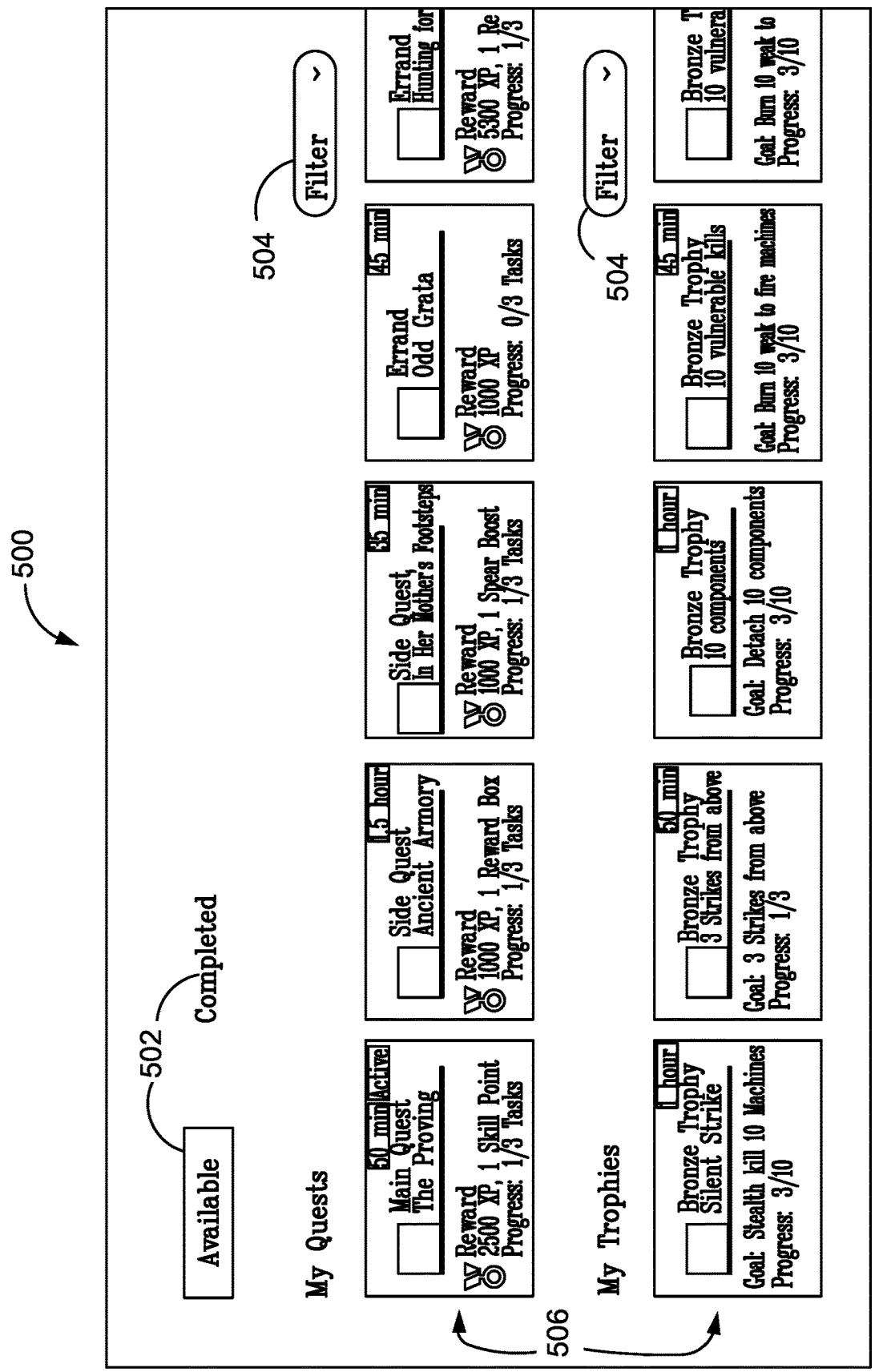
FIG. 5 illustrates an exemplary user interface for displaying context-based action suggestions.

The identified available activities, which may be prioritized, may be displayed in an exemplary user interface 500, illustrated in FIG. 5. The identified available activities may be filtered by available activities or completed activities 502. Filtering by available activities may display activities available to the user while completed activities may display activities that have been completed by the user. In the illustrated example, the activities are displayed by either a lists of quests or trophies 506 associated with the available activity. Each display 506 may include activity information (e.g., user progress, activity title, reward or trophy available, and/or elapsed time since last played by the user) and/or quest or trophy information. Each of the lists of quests and or trophies displayed 506 may be further filtered 504 by other properties (e.g., user progress, activity title, and or type of reward or quest).

Turning back to FIG. 2, in step 240, one or more actions are filtered based on availability to the user and the current user status for each identified activity by the platform servers 120 and/or interactive content source servers 110. For example, a buy action may be available to a user that does not own the associated activity whereas a start action may be available to a peer that owns the same activity. In other examples, an updated user status may be received by the platform servers 120 and/or interactive content source servers 110. A new set of one or more activities available to the user may be identified based on the updated user status. One or more actions may be filtered based on availability to the user and the updated user status for each new identified activity and, as also described below, a new priority action and new activity information for each new identified activity may be displayed. In other words, the priority action may change based on changes to the user status. For example, if a user buys an activity and/or the associated interactive content title, the priority action may change from a buy action to a start action.

In step 250, a subset of the filtered actions is displayed by the platform servers 120 and/or interactive content source servers 110 on the user device 140. Displaying the subset of the filtered actions may include displaying the priority action, as shown in FIGS. 3A-F, and additional actions in an overflow view. In some examples, the priority action and/or the additional actions may be displayed with activity information. The filtered actions may be displayed at any time during the user's interaction with the platform servers 120 and/or an interactive content title. For example, a subset of filtered actions may be displayed to the user when the user views current trophies. In another example, a subset of identified actions may be displayed to the user during interactive with an interactive content title. In yet another example, a subset of identified actions may be displayed to the user after the user has completed an activity and/or completed the interactive content title. The filtered actions may be displayed on any user devices 140, including a mobile device. Display of such filtered actions on a mobile device may enable a user to interact with an activity directly on such mobile device or to launch the activity on a console for direct interaction with the activity when the user has access to the console, as described in more detail with respect to FIG. 4 below.

Figure 4:
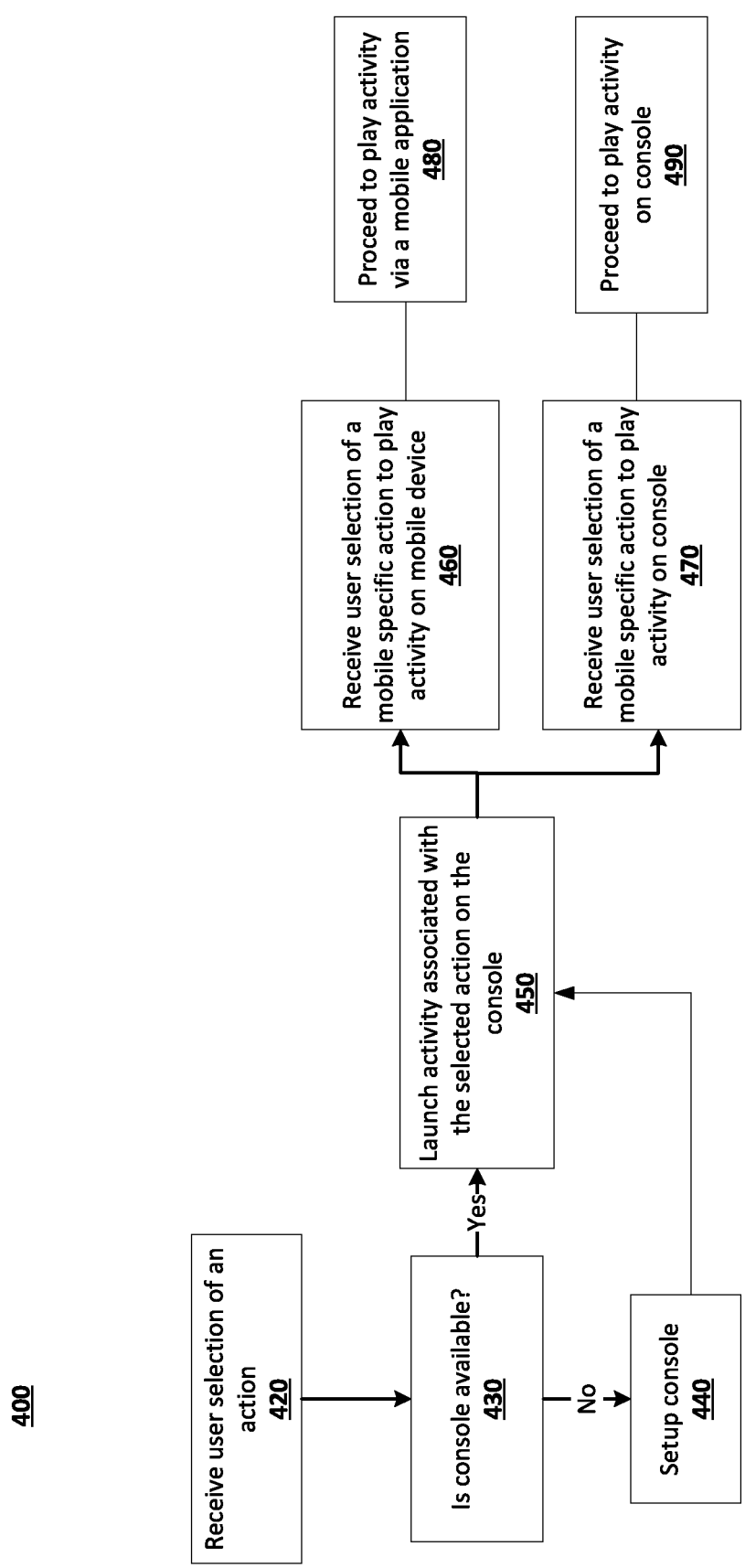
FIG. 4 illustrates an exemplary method of launching an activity by a mobile user device.

FIG. 4 is a flowchart illustrating an exemplary method of launching an activity by a mobile user device. The method 400 of FIG. 4 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 4 are performed in the cloud). The steps identified in FIG. 4 (and the order thereof) are exemplary and may include various alternatives, equivalents, or derivations thereof including but not limited to the order of execution of the same.

In step 420, a user selection of an action is received by a user device 140 (e.g., a mobile device). The action may be displayed on a display screen of the mobile device after filtering and prioritization of the action as described above. Generally, actions selected on the mobile device may transmit instructions to the console. For example, a mobile pinning action and an mobile unpinning action may be displayed. Selection of such mobile pinning action may queue an associated activity on a console (e.g., a gaming console, a computer, etc.) associated with the mobile device. Such mobile pinning action may transmit an activity id and/or activity information of the activity to the console and instruct the console to queue the activity. Such activity is then ready for immediate interaction on the console when the user has access to the console. Selection of the mobile unpinning action may remove the associated activity from the queue by transmitting instructions to the console to end the associated activity on the console.

The user selection of the action may trigger the mobile device to check if the console associated with the mobile device is available in step 430. The mobile device may transmit instructions to the console to power on the console and a platform system installed on said console in step 440 when the console is not available. When the console is available, the mobile device may transmit an activity id and activity information associated with the activity of the selected action to the console in step 450. The mobile device may also transmit instructions to launch the activity based on the activity id and activity information via a backend cloud server.

In step 460, a user selection of at least one mobile action to play an activity on the mobile device is received. The at least one mobile action may include a remote play action or a console play action. Selection of the remote play action may launch a mobile application that streams the activity from the console and transmits user input to the console. If the mobile application is not available, the mobile device may prompt the user to download such mobile application. Selection of console play action may transfer control of the activity to the console, where the activity is ready for play since the activity was launched in step 450.

Systems and methods for making context-based action suggestions advantageously provide highly targeted and personalized action suggestions to a user. Such systems and methods provide activity suggestions and priority actions that are applicable to a user's current status, rather than solely based on the user's historical use. As such, a user may be more likely to select a suggested action based on a context of the user's current interaction with the platform and/or interactive content titles and thus, foster a positive experience for the user.

Figure 6:
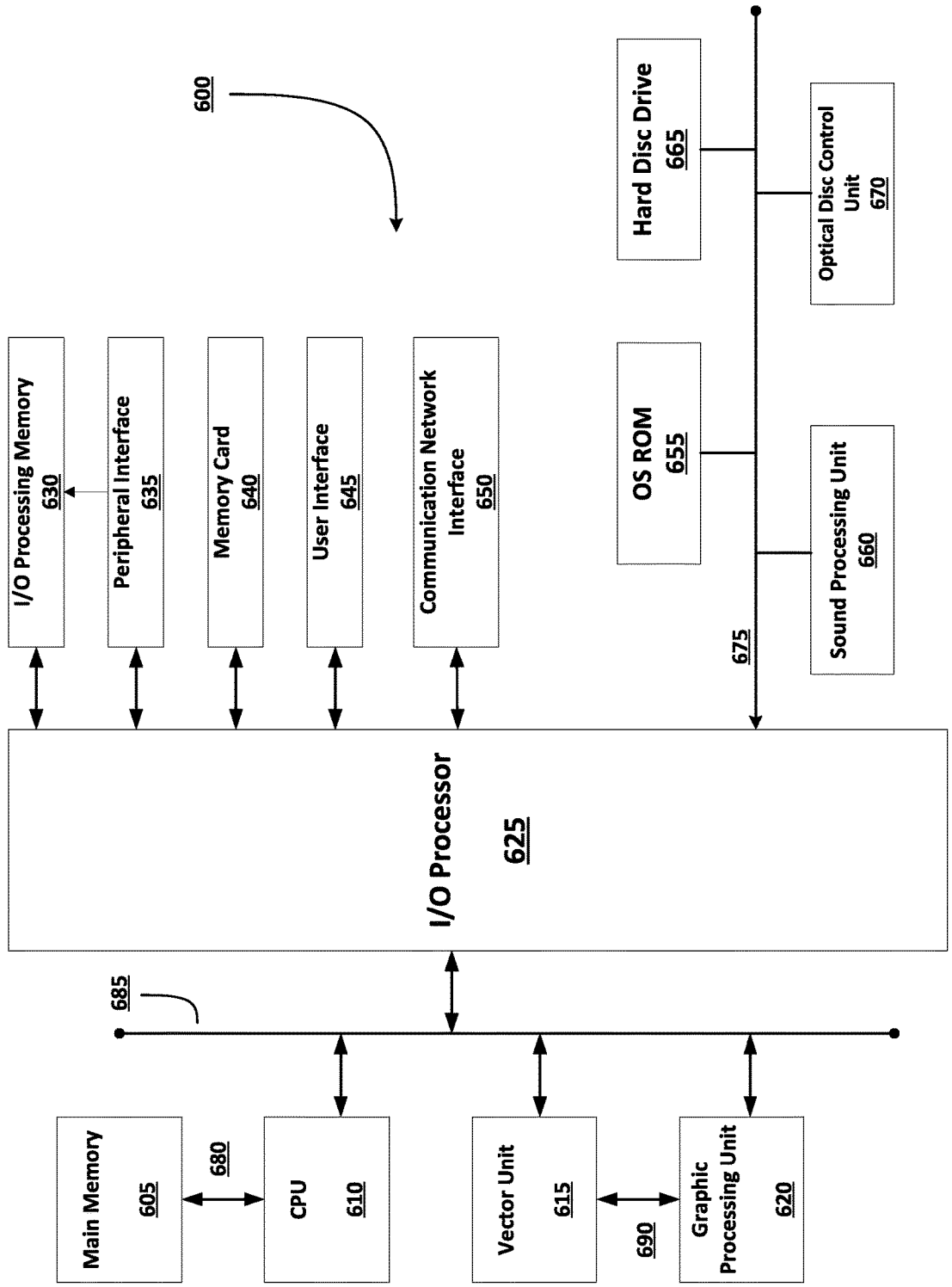
FIG. 6 is an exemplary electronic entertainment system that may be used in making context-based action suggestions.

FIG. 6 is an exemplary user electronic entertainment system that may be used in launching interactive content and providing dynamic interfaces. The entertainment system 600 of FIG. 6 includes a main memory 605, a central processing unit (CPU) 610, vector unit 615, a graphics processing unit 620, an input/output (I/O) processor 625, an I/O processor memory 630, a peripheral interface 635, a memory card 640, a Universal Serial Bus (USB) interface 645, and a communication network interface 650. The entertainment system 600 further includes an operating system read-only memory (OS ROM) 655, a sound processing unit 660, an optical disc control unit 670, and a hard disc drive 665, which are connected via a bus 675 to the I/O processor 625.

Entertainment system 600 may be an electronic game console. Alternatively, the entertainment system 600 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 610, the vector unit 615, the graphics processing unit 620, and the I/O processor 625 of FIG. 6 communicate via a system bus 685. Further, the CPU 610 of FIG. 6 communicates with the main memory 605 via a dedicated bus 680, while the vector unit 615 and the graphics processing unit 620 may communicate through a dedicated bus 690. The CPU 610 of FIG. 6 executes programs stored in the OS ROM 655 and the main memory 605. The main memory 605 of FIG. 6 may contain pre-stored programs and programs transferred through the I/O Processor 625 from a CD-ROM, DVD-ROM, or other optical disc (not shown) using the optical disc control unit 670. I/O Processor 625 of FIG. 6 may also allow for the introduction of content transferred over a wireless or other communications network (e.g., 5G, LTE, 1G, and so forth). The I/O processor 625 of FIG. 6 primarily controls data exchanges between the various devices of the entertainment system 600 including the CPU 610, the vector unit 615, the graphics processing unit 620, and the peripheral interface 635.

The graphics processing unit 620 of FIG. 6 executes graphics instructions received from the CPU 610 and the vector unit 615 to produce images for display on a display device (not shown). For example, the vector unit 615 of FIG. 6 may transform objects from three-dimensional coordinates to two-dimensional coordinates, and send the two-dimensional coordinates to the graphics processing unit 620. Furthermore, the sound processing unit 660 executes instructions to produce sound signals that are outputted to an audio device such as speakers (not shown). Other devices may be connected to the entertainment system 600 via the USB interface 635, and the communication network interface 650 such as wireless transceivers, which may also be embedded in the system 600 or as a part of some other component such as a processor.

A user of the entertainment system 600 of FIG. 6 provides instructions via the peripheral interface 635 to the CPU 610, which allows for use of a variety of different available peripheral devices (e.g., controllers) known in the art. For example, the user may instruct the CPU 610 to store certain game information on the memory card 630 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for making context-based action suggestions, the method comprising:
    storing data regarding activities in memory, each activity associated with an interactive content title and a plurality of actions, wherein each action corresponds to a different way of launching the associated activity;
    receiving information regarding a current user status of a user for each activity, wherein the current user status includes a device status of one or more devices associated with the user;
    identifying a set of the activities available to the user based on the current user status, wherein a subset of the identified activities has a playtime estimate that meets a playtime threshold;
    filtering the plurality of actions for each of the identified activities in the subset based on the current user status, wherein a subset of filtered actions includes at least one mobile action and a console action;
    generating a display of the subset of the filtered actions for the subset of the identified activities, wherein the subset of filtered actions is provided for display on a mobile device associated with the user;
    receiving a selection of the console action from the subset of filtered actions; and
    launching an activity associated with the selected console action on a console associated with the mobile device.

2. The method of claim 1, wherein the current user status includes at least one of ownership information and progress for each activity.

3. The method of claim 1, wherein the display of the subset of the filtered actions includes a priority action and activity information associated with the priority action for each identified activity.

4. The method of claim 3, further comprising:
    receiving an updated user status;
    identifying a new set of activities available to the user based on the updated user status;
    filtering the actions available to the user based on the updated user status for each new identified activity; and
    updating the display based on a new priority action and new activity information for each new identified activity.

5. The method of claim 1, wherein identifying the set of activities is based on one or more of a category, a sub category, a time limited availability, associated rewards, a minimum or maximum number of players, and associated tasks.

6. The method of claim 1, further comprising prioritizing each of the identified available activities based on the current user status for each activity and user information.

7. The method of claim 6, wherein prioritizing each of the identified available activities is based on at least one of mode of play, an availability of peers, peer status within the identified one or more of the interactive content titles, a predicted available playtime of the user, a user preferred content, currently viewed content of the user, a preferred user activity type, frequency of user interaction with each identified activity, frequency of peer interaction with each identified activity, recent user interaction with each identified activity, recent peer interaction with each identified activity, and a respective level of how new each activity is.

8. The method of claim 6, wherein prioritizing each of the identified available activities is based on each identified activity having the playtime estimate that meets the playtime threshold and results in identifying the subset of the identified activities.

9. The method of claim 7, further comprising setting the playtime threshold based on the predicted available playtime of the user.

10. The method of claim 7, further comprising identifying the predicted available playtime of the user based on one or more of a schedule of the user, a calendar of the user, and historical user activity at one or more times of day.

11. The method of claim 7, wherein prioritizing each of the identified available activities based on the currently viewed content further prioritizes the filtered actions based on a type of the currently viewed content, wherein the currently viewed content includes at least one of the interactive content titles, a social page, a rewards page, a page of recently played activities, a peer profile, and a page of peer activities.

12. The method of claim 6, wherein the current user status includes a location of an associated game character within an environment of the interactive content title, and wherein prioritizing each of the identified available activities is further based on a distance between a respective location of each activity and the location of the game character.

13. The method of claim 1, further comprising:
receiving a selection of the at least one mobile action;
launching a mobile application that streams the activity associated with the selected mobile action from the console associated with the mobile device; and
transmitting user inputs to the console.

14. The method of claim 1, further comprising:
receiving a selection of the at least mobile action; and
transferring control of the activity associated with the selected mobile action to the console associated with the mobile device.

15. A system for making context-based action suggestions, the system comprising:
memory that stores data regarding activities in memory, each activity associated with an interactive content title and a plurality of actions, wherein each action corresponds to a different way of launching each associated activity; and
a processor that executes instructions stored in memory, wherein execution of the instructions by the processor:
receives information regarding a current user status of a user for each activity, wherein the current user status includes a device status of one or more devices associated with the user,
identifies a set of the activities available to the user based on the current user status, wherein a subset of the identified actions has a playtime estimate that meets a playtime threshold,
filters the plurality of actions for each identified activity in the subset based on the current user status, wherein a subset of filtered actions includes at least one mobile action and a console action,
generates a display of the subset of the filtered actions for the subset of the identified activities, wherein the subset of the filtered actions is provided for display on a mobile device associated with the user,
receives a selection of the console action from the subset of filtered actions, and
launches an activity associated with the selected console action on a console associated with the mobile device.

16. The system of claim 15, wherein the current user status includes at least one of ownership information and progress for each activity.

17. The system of claim 15, wherein the display further displays a priority action and activity information associated with the priority action for each identified activity.

18. The system of claim 17, wherein execution of the instructions by the processor further:
receives an updated user status;
identifies a new set of activities available to the user based on the updated user status;
filters the actions available to the user based on the updated user status for each new identified activity; and
updates the display to include a new priority action and new activity information for each new identified activity.

19. The system of claim 15, wherein identifying the set of activities is based on one or more of a category, a sub category, a time limited availability, associated rewards, a minimum or maximum number of players, and associated tasks.

20. The system of claim 15, wherein execution of the instructions by the processor further prioritizes each of the identified available activities based on the current user status for each activity and user information.

21. The system of claim 20, wherein prioritizing each of the identified available activities is based on at least one of mode of play, an availability of peers, peer status within the identified one or more of the interactive content titles, a predicted available playtime of the user, a user preferred content, currently viewed content of the user, a preferred user activity type, frequency of user interaction with each identified activity, frequency of peer interaction with each identified activity, recent user interaction with each identified activity, recent peer interaction with each identified activity, and a respective level of how new each activity is.

22. The system of claim 20, wherein prioritizing each of the identified available activities is based on each identified activity having the playtime estimate that meets the playtime threshold and results in identifying the subset of the identified activities.

23. The system of claim 20, wherein the current user status includes a location of an associated game character within an environment of the interactive content title, and wherein prioritizing each of the identified available activities is further based on a distance between a respective location of each activity and the location of the game character.

24. The system of claim 21, wherein execution of the instructions by the processor further identifies the predicted available playtime of the user based on one or more of a schedule of the user, a calendar of the user, and historical user activity at one or more times of day.

25. The system of claim 21, wherein prioritizing each of the identified available activities based on the currently viewed content further prioritizes the filtered actions based on a type of the currently viewed content, wherein the currently viewed content includes at least one of the interactive content titles, a social page, a rewards page, a page of recently played activities, a peer profile, and a page of peer activities.

26. The system of claim 20, wherein execution of the instructions by the processor further:
receives a selection of the at least one mobile action;
launches a mobile application that streams the activity associated with the selected mobile action from the console associated with the mobile device; and
transmits user input to the console.

27. The system of claim 20, wherein execution of the instructions by the processor further:
receives a selection of the at least mobile action; and
transfers control of the activity associated with the selected mobile action to the console associated with the mobile device.

28. A non-transitory computer-readable medium having embodied thereon a program executable by a processor to perform a method for making context-based action suggestions, the method comprising:
storing data regarding activities in memory, each activity associated with an interactive content title and a plurality of actions, wherein each action corresponds to a different way of launching each associated activity;
receiving information regarding a current user status of a user for each activity, wherein the current user status includes a device status of one or more devices associated with the user;

identifying a set of the activities available to the user based on the current user status, wherein a subset of the identified activities has a playtime estimate that meets a playtime threshold;

filtering the plurality of actions for each identified activity in the subset based on the current user status, wherein a subset of filtered actions includes at least one mobile action and a console action;

generating a display of the subset of the filtered actions for the subset of the identified activities, wherein the subset of the filtered actions is provided for display on a mobile device associated with the user;

receiving a selection of the console action from the subset of filtered actions; and launching an activity associated with the selected console action on a console associated with the mobile device.

* * * * *